July 23, 1940.  F. HOMRICH  2,208,725
PHOTOGRAPHIC REPRODUCING APPARATUS
Filed May 10, 1938    4 Sheets-Sheet 3

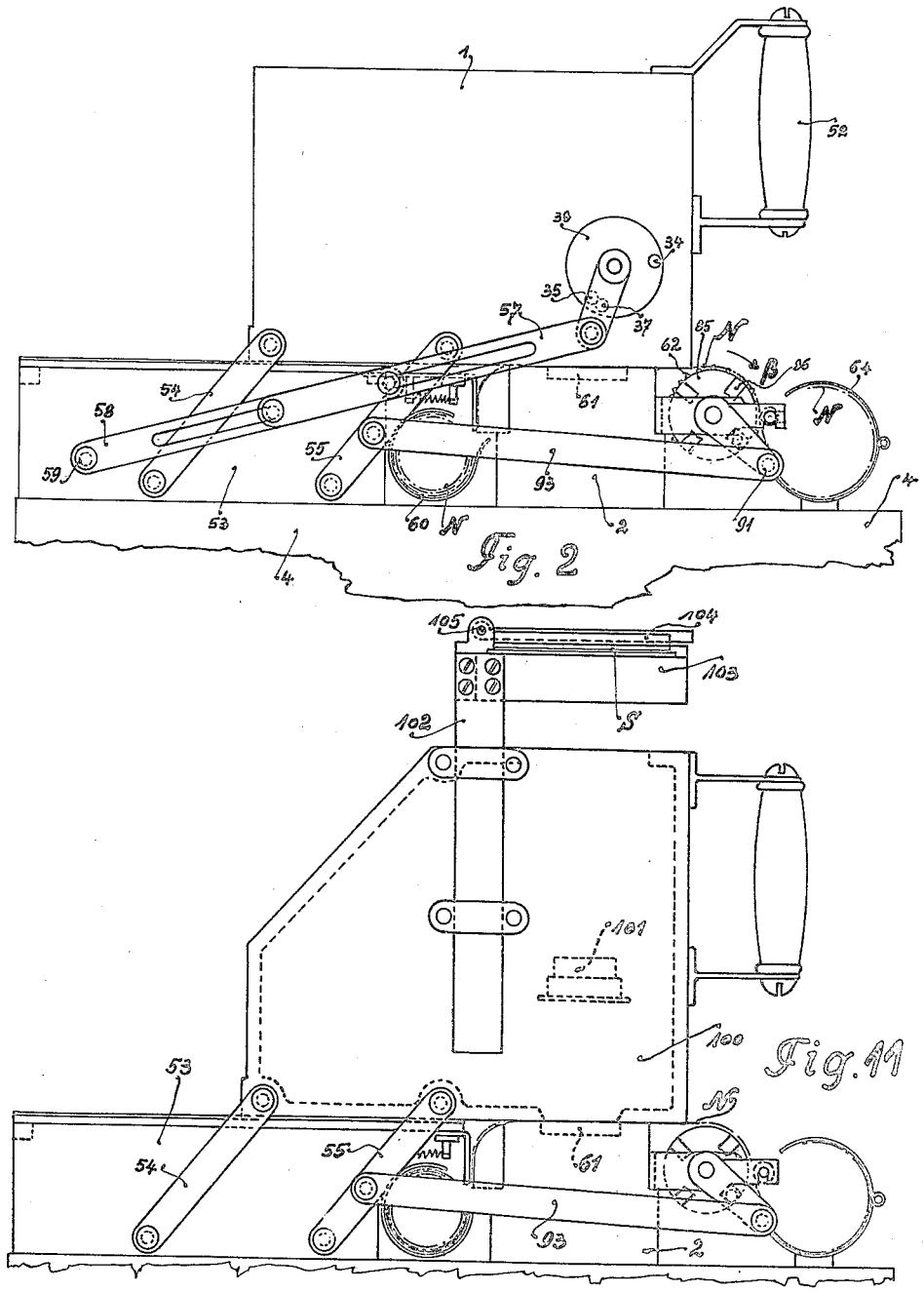

Inventor:
Ferdinand Homrich
by Frank S. Appleman,
Attorney.

July 23, 1940.　　　　F. HOMRICH　　　　2,208,725
PHOTOGRAPHIC REPRODUCING APPARATUS
Filed May 10, 1938　　　4 Sheets-Sheet 4
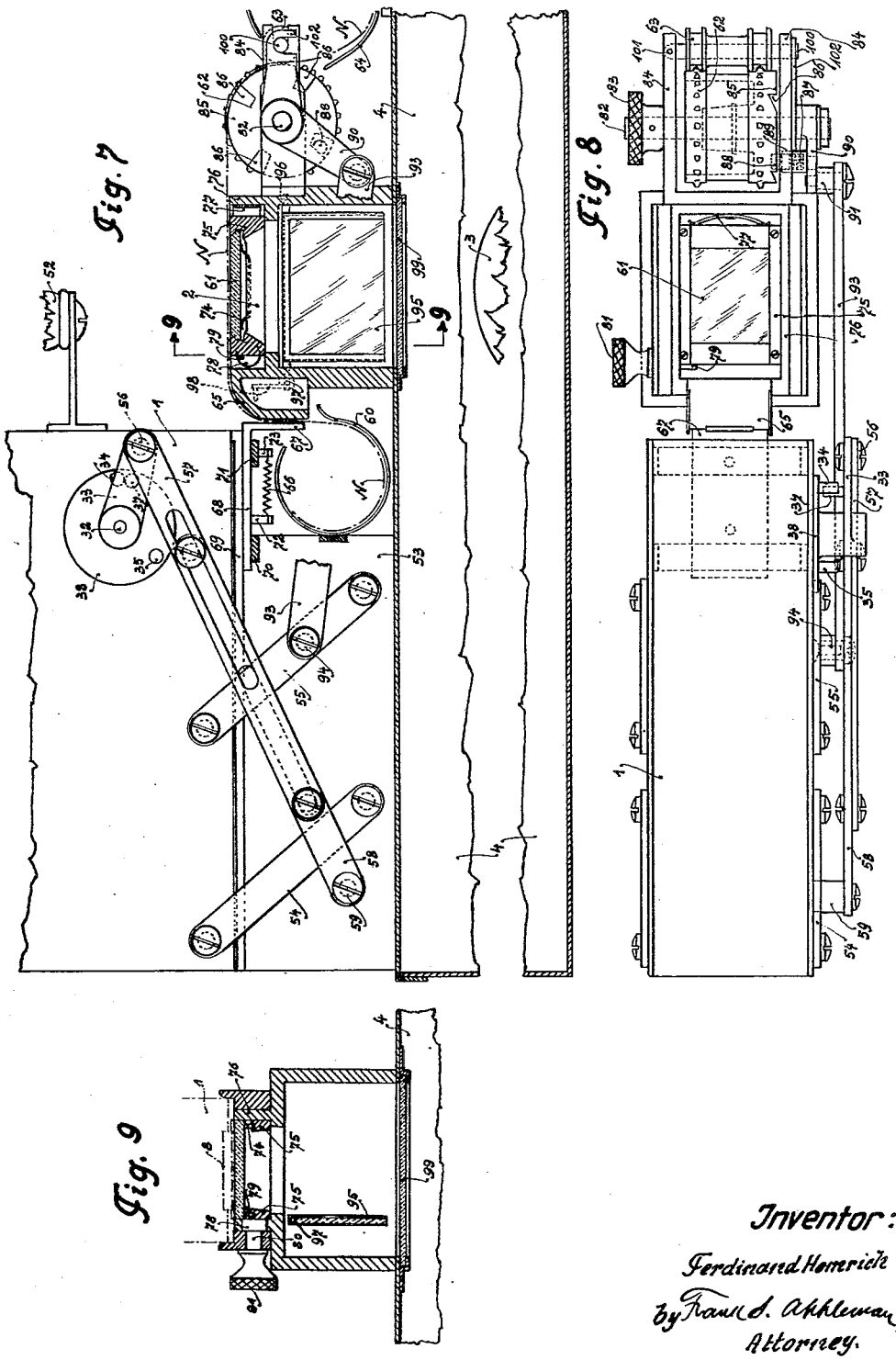
Inventor:
Ferdinand Homrich
by Frank S. Ahleman,
Attorney.

Patented July 23, 1940

2,208,725

UNITED STATES PATENT OFFICE 2,208,725

PHOTOGRAPHIC REPRODUCING APPARATUS

Ferdinand Homrich, Hamburg-Altona, Germany

Application May 10, 1938, Serial No. 207,072
In Germany January 19, 1937

4 Claims. (Cl. 95—75)

This invention relates to a photographic reproducing apparatus for film strips, which is provided with an artificial light source and by means of which individual pictures in any desired sequence may be printed from a negative film strip or enlarged. Furthermore, each individual picture can be examined and tested for density prior to reproduction to allow the amount of light to be modified to suit the density and to determine a uniform time of exposure for all successively printed pictures.

The invention attains its object by providing means for moving the film strip to be reproduced forward and backward on an exposure window disposed above the artificial light source and fixing it thereto and by employing for the reception of the light sensitive emulsion support to be reproduced a casing which can be applied to and removed from the exposure window.

This construction affords the advantage that the individual picture concerned is fully uncovered over its entire surface and can be readily tested as to density by suitable means, as a photoelectric cell, a photometer, etc.

The reproducing apparatus may further be so constructed that the negative film strip to be reproduced is moved by the casing containing the emulsion support in that it is displaced through one picture space every time the casing is applied to the exposure window.

According to the invention, printing arrangements are made which allow the sensitive positive strip to be applied to and removed from the negative film strip for the printing of each individual picture, this being effected in such manner that the application and removal of the film strip brings about either its own advance through one picture space or a similar advance of the negative strip. This may for instance be effected by mounting the positive strip in a movable casing which contains the feeding mechanism of the strip and which transmits its movement by means of a linkage to this mechanism so that at each forward movement or application of the casing an advance of the positive strip takes place. As one of the links which carry the casing is connected by a rod to the feeding device for the film strip, an advance of the strip through one picture space will be effected on the return movement or removal of the casing.

Further characteristic features of the invention are that the negative strip is moved intermittently by means of a feeding roller of known type over a window which corresponds in size to the individual pictures, the feeding movement of this roller being controlled by a mechanism which carries and feeds the positive strip, so that, on the application of the latter to the negative strip, the positive strip will be advanced through one picture space whilst the negative strip will be advanced through one picture space when the positive strip is returned, whereby double exposures are prevented.

For producing enlargements according to the invention the casing for the positive strip is replaced by a movable or detachable enlarging device which permits the enlargement of individual pictures or views and their examination as to density.

Two embodiments of the invention are illustrated in the accompanying drawings, in which Figures 1 to 9 show a device for producing contact prints and Figs. 10 and 11 a device for making enlargements.

More particularly:

Fig. 2 is a similar view to Fig. 1, but shows the position of the elements during the exposure of the positive strip.

Fig. 7 is a sectional view of the feeding device for the positive strip.

Fig. 8 is a plan view of Fig. 7.

Fig. 9 is a section on the line 9—9, of Fig. 7, and

Figs. 10 and 11 are side views of an enlarging device.

Figure 1:
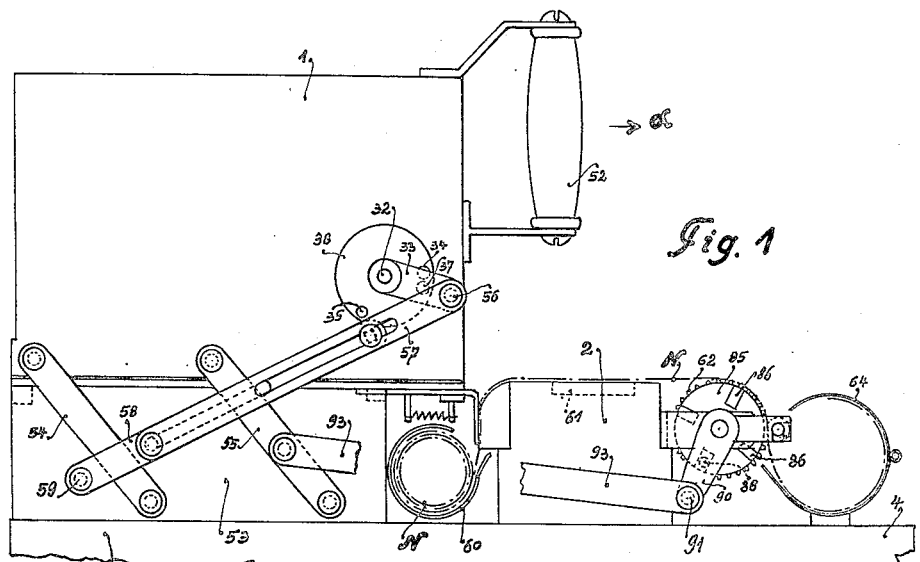
Figure 1 is a general view in which the negative strip has been uncovered for the determination of its density.

The novel photographic reproducing device as shown in Figs. 1 to 9 essentially consists of a container 1 for the positive strip and a feeding device, designated 2 as a unit, for the negative strip. The two structures are operatively interconnected by means of a linkage and mounted on the cover of a printing apparatus 4 provided with an artificial light source 3.

Figure 6:
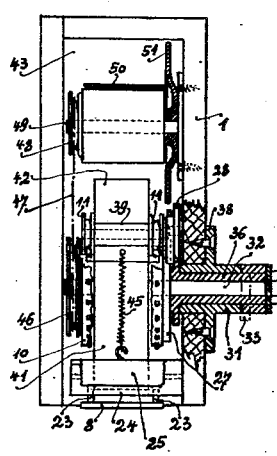
Fig. 6 is a partial section on the line 6—6, of Fig. 5.
Figure 5:
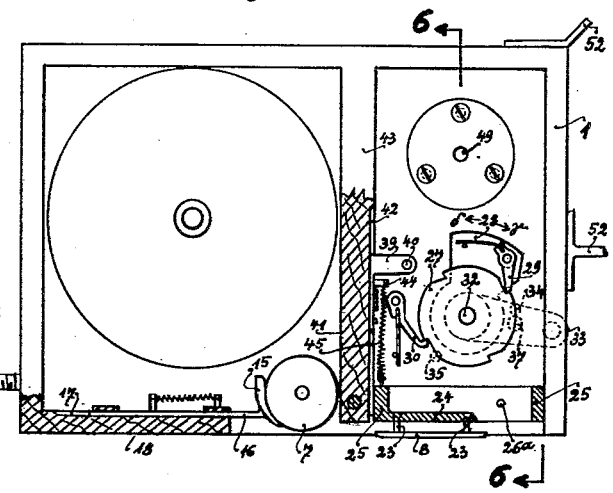
Fig 5 is a similar view to Fig. 3 with the take-up and feed rollers for the positive strip left out.

The container 1 holds an unexposed sensitive emulsion support 5 which corresponds in width to that of the negative film strip N from which the prints are to be made and which is mounted on the device 2. The positive strip 5 is provided at the edges with the same known arrangement of perforations as the negative strip, and is wound into a roll and supported on a bolt 6. From the latter the strip is led over the guide roller 7, under a resilient presser plate 8, over the guide roller 9, a toothed roller 10 the teeth of which are spaced in conformity with the edge perforations, and a guide roller 11 to a take-up roller 12. Thus the positive strip 5 will be unwound and rewound on the roller 12. In order that this may be effected in a faultless manner, and that the teeth of the feeding roller 10 should engage reliably in the perforations of the positive strip to make the feeding correspond to that of the negative strip N, the following arrangement is provided:

The positive strip 5 is pressed lightly against the deflecting roller 7 by means of a shoe 15 which is controlled by a spring 14. The shoe 15 is guided by means of a prismatic rod 16 in a groove 17 in the bottom plate 18 and is retained by means of cover strips 19, 20 in a position of use. The spring 14 is connected at one end to a pin 21 which is firmly secured to the cover strip 20, the other end of the spring being connected to a pin 22 firmly secured to the rod 16. The function of the plate 8 is to press the positive strip 5 firmly against the negative strip during the printing process. For this purpose, the plate 8 is fitted with rigid pins 23 by means of which it is slidably guided in the part 24 of a base plate 25 mounted in the casing 1, so that it can yield in opposition to its spring 26. Secured rigidly to the base plate 25 is a shaft 26a whereon the deflecting roller 9 is loosely mounted. From the deflecting roller 9 the positive strip is led over the toothed roller 10 to the take-up roller 12. As indicated in Fig. 5, a ratchet wheel 27 is rigidly connected with the toothed roller 10 and cooperates with an operating pawl 29 mounted on a rotary sector 28 and also with a detent pawl 30 mounted on the casing 1. The sector 28 is rigidly connected to a sleeve 36 mounted in a bearing 31, as shown in Fig. 6. Connected to the sleeve 36, moreover, is a lever 33, Fig. 5, the movement of which is limited by abutments 34, 35 secured to the base plate 38 (Fig. 6) of the bearing 31, the lever 33 being provided with a stud 37 for cooperation with the abutments. The guide rollers 11 cooperate with the toothed feeding roller 10 and prevent the positive strip 5 from accidentally leaving the roller. The rollers 11 are loosely rotatable about a bolt 40 which is rigidly connected to a bearing 39. As Fig. 5 shows, the latter is fitted within a base plate 41 which is guided in a groove 42 in the wall 43 of the casing 1. The base plate 41 of the bearing 39 is provided with a pin 44 which holds one end of a spring 45 the opposite end of which is connected with the base plate 25. The spring 45 tends to pull the bearing 39 upwards and thus presses the rollers 11 against the circumference of the toothed roller 10. Connected to the latter is a sheave 46, shown in Fig. 6, which cooperates with a sheave 48 through the medium of a motion transmitting element 47. The sheave 48 is rigidly secured to the take-up roller 12 and rotates together with the latter about a shaft 49 connected to the casing 1. The take-up roller 12 is provided with a resilient tongue 50 for holding the end of the strip to be wound on it. A disc 51 which is loosely mounted on the shaft 49 serves as a guide for the positive strip 5. The casing 1 is fitted with a handle 52, as shown in Figs. 1, 2 and 7, and is removably supported on a frame 53 which is firmly secured to the cover plate of the casing 4. The casing 1 is connected to the frame 53 by means of parallel links 54 and 55. To the pivot pin 56 of the lever 33, which moves about the shaft 32, a link section 57 is connected which is slidable relative to a link section 58 and which is movable together with the latter about a pin 59, secured to the frame 53, so that the casing 1 can be moved by means of the handle 52 in the direction of the arrow α and transported from the position shown in Fig. 1 into the position shown in Fig. 2.

The feeding device for the negative strip N consists of a delivery drum 60, shown in Fig. 7, from which the negative strip N is led over an exposure window 61 and over a toothed roller 62 which cooperates with a presser roller 63, into a take-up drum 64. To obtain reliable feeding of the negative strip N, the end thereof which comes from the drum 60 is led over a rigid guide surface 65 against which it is pressed by a plate 67 controlled by a spring 66. The plate 67 has a tail piece 68 which is arranged to slide in guides 70, 71 on the cover plate 69 of the frame 53. One end of the spring 66 is connected to a pin 72 mounted on the drum 68, and the other end of the spring 66 is connected with a pin 73 mounted on the guide 71. The exposure window 61 is controlled by springs 74 and rests in a frame 75 arranged in a second frame 76 which is mounted rigidly on the cover plate of the casing 4 and within which the frame 75 can be displaced in the direction of the negative strip N in opposition to a spring 77 and by means of a pin 79 eccentrically mounted in a disc 78. For this purpose the disc 78 is rotatably held in the frame 76 and has an attachment 80 which projects through the frame and is fitted with a hand wheel 81 at its free end.

The purpose of the displaceable arrangement of the frame is to enable the window 61 to be adjusted and set in exact register with the individual pictures of the negative strip N.

From the exposure window 61 the negative strip N is led over a toothed drum 62, and owing to the presser roller 63 the perforations at the edges of the negative strip remain constantly in engagement with the teeth of the roller 10. The toothed roller 62 is rigidly mounted on a shaft 82 provided with a hand grip 83, Fig. 8, and rotatably mounted in arms 84 which are secured to the supporting frame 76. The drum 62 is connected with a disc 85 fitted with ratchet teeth 86 the distance between which is equal to the picture length of the negative strip N. A bolt 88 which is controlled by a spring 87 and which is slidable in axial direction in a sleeve 89 cooperates with the ratchet teeth 86. The sleeve 89 is rigidly connected to a lever 90 which is rotatably mounted on the shaft 82. At the free end of the lever 90 there is a pivot pin 91 which is engaged by a rod 93 pivoted to the link 53 by a pin 94.

In the frame 76 a filter, for instance a yellow screen 95, is provided which can be turned by means of a handle 98, Fig. 7, about pins 96, 97 from its vertical position into a horizontal position. Under the frame 76 an opal screen 99 is disposed on which various kinds of stops, not shown, may be supported for regulating the light intensity. This arrangement allows the light to be modified according to the density of each particular negative, so that the length of exposure can be the same in each case.

As indicated in Figs. 7 and 8, the roller 63 is rotatable about a shaft 100 which is mounted in the arms 84 and adapted to be swung in a horizontal plane about a pin 101 in order to allow the negative strip N to be readily introduced between the roller 63 and the toothed drum 62. In its position of use the shaft 100 is engaged by a hook 102 which is movable about the shaft 82 and which guards the shaft 100 against accidental displacement.

The device functions as follows:

When all parts are in the position shown in Fig. 1 and a print is to be made from one of the pictures of the negative strip N disposed on the exposure window 61, the handle 52 of the casing 1 is gripped and the casing 1 moved thereby into the position shown in Fig. 2. By this action the lever 90 is also moved into the postion shown in Fig. 2, and the bolt 88 slides over the face of of the disc 85 into engagement with one of of the ratchet teeth 86 of the disc 85. The part of the positive strip which is disposed under the presser plate 8 can now be exposed by the switching on of the light source 3. After the exposure, the casing 1 is restored to the position shown in Fig. 1. During this movement of the container 1 the lever 90 will be moved through the medium of the links 93 and 55 from the position shown in Fig. 2 into the position shown in Fig. 1. Since now the bolt 88 is in engagement with one of the teeth of the toothed drum 62, the movement of the lever 90 will cause the drum 62 to turn in the direction of the arrow $\beta$, as indicated in Fig. 2, and the negative strip will be drawn over the exposure window 61 through the extent of one picture space, so that, when the casing 1 is returned, the next picture to be printed from the negative strip N will move automatically into position over the exposure window. When the picture of the negative now disposed on the exposure window 61 is to be printed, the casing 1 is again moved in the direction of the arrow in Fig. 1, and the positive strip will then be moved through one picture space from the delivery roller 5 on to the take-up roller 12, in that the lever 33 connected to the links 57, 58 will be moved from the position shown in Fig. 1 into the position shown in Fig. 2. In this movement of the lever 33 the sector 28, which is connected to it through a sleeve 36, will be turned in the direction of the arrow $\gamma$ (Fig. 5), and the pawl 29 from the sector will transmit the motion to the ratchet wheel 27 and to the drum 10 rigidly connected to the wheel. By this movement of the toothed drum 10 the positive strip 5 under the presser plate 8 will be advanced through one picture space. To prevent the toothed drum 10 from returning accidentally when the sector 28 moves in the direction of the arrow $\delta$, the detent pawl 30 is provided. To insure reliable winding of the positive strip 5 (Fig. 3) on the roller 12 during the feeding of the strip, the rotary motion of the toothed drum 10 is transmitted by means of the motion transmitting element 47 to the roller 12 so that the latter will participate in the movement.

The toothed drum 62 can also be moved by means of the handle 83 (Fig. 8) independently of the rest of the mechanism, which is advantageous when individual pictures of the negative strip N are to be omitted from the printing operation.

Figure 10:
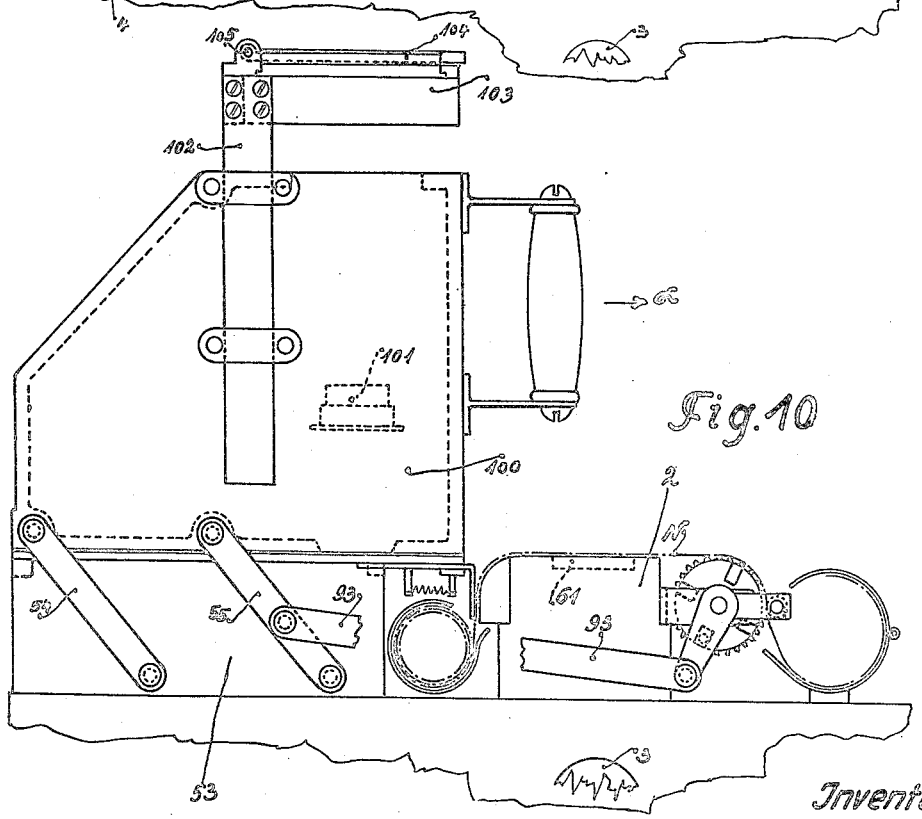
Figure 4:
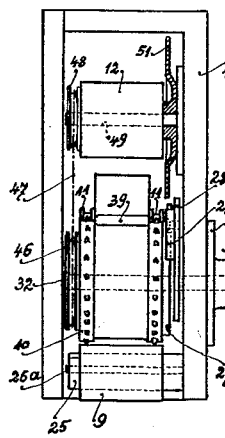
Fig. 4 is a section on the line 4—4, of Fig. 3.
Figure 3:
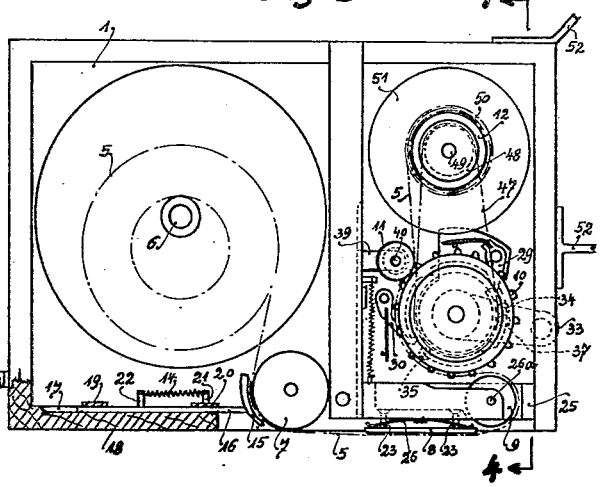
Fig. 3 is a view showing the container for the positive strip with its feeding device.

When pictures are to be enlarged, the casing 1 for the positive strip is replaced, as shown in Figs. 10 and 11, by an enlarging device 100 which is movable so as to permit the selection of individual pictures from a negative strip for enlargement and the examination of density.

For this purpose, the enlarging frame 100 is connected with the linkages 54, 55, 93 and like the casing 1 for positive strips can then be brought into position for exposure by being moved on the feeding device 2 for the negative strip N in the direction of the arrow $\alpha$.

In the position shown in Fig. 11 enlarging of a desired portion of the negative strip N can be effected by means of the light source 3 the rays of which pass through the exposure window 61, the negative N and the lens 101 to the emulsion carrier S arranged in a holder 103 and adjustable relative to the frame 100 by a rail 102. To the holder 103 a mirror 104 is hinged to 105 which can be adjusted so as to clearly show the enlargement. The mirror 104 with its frame serves to secure the emulsion carrier S to its holder 103 during the enlarging operation.

The motion of the enlarger 100 from the position shown in Fig. 10 and into the position shown in Fig. 11, and vice versa, causes automatic motion of the negative strip N in the same manner as described with respect to the printing unit.

I claim:

1. In a photographic reproducing apparatus for successively reproducing photographs from a negative film strip on to a light sensitive strip an artificial light source, an exposure window disposed above the light source, means for moving the negative film strip forward and backward on the exposure window, a casing for receiving the sensitive strip for reproduction, said casing being applicable to and removable from said exposure window and serving to hold the sensitive strip in contact with the negative film strip, and an operative connection between said casing and means constructed and arranged to effect film feeding movement of the said means upon movement of the casing in one direction.

2. In an apparatus for printing positives from film strip negatives, a base element, a casing normally resting on said base element, a pair of parallel motion links connecting said base and casing, means in said casing for supporting a sensitized strip and including a feed roller provided with an actuating shaft, a crank on said shaft, a link connecting said base and shaft, said link being operative to rotate the shaft as the casing swings from normal to printing position, means to support and feed a negative film strip including a negative feed roller, said negative film strip being positioned for contact by the sensitized film upon the casing being swung from normal to printing position, and a ratchet mechanism imparting a step-by-step movement to the negative feed roller and including a pawl carrying crank and a link connecting the pawl carrying crank and one of the parallel motion links.

3. In an apparatus for printing positives from film strip negatives, a base, a casing for sensitized films normally seated on said base, a negative film support mounted adjacent one end of the base, guide means connecting the base and casing for producing guided swinging movement of the casing between normal position and position over the negative film strip, means for feeding a sensitized film within said casing and operable to produce feeding movement of said sensitized film upon swinging movement of the casing between normal and printing positions, and other means for feeding the negative film and operable to advance said negative film upon each movement of the casing from printing to normal positions, the means for feeding the sensitized film including a feed shaft extending transversely of the casing, a feed roller on the shaft, a crank on said shaft, and a link connecting said crank and base.

4. In an apparatus for printing positives from film strip negatives, a base, a casing for sensitized films normally seated on said base, a negative film support mounted adjacent one end of the base, guide means connecting the base and casing for producing guided swinging movement of the casing between normal position and position over the negative film strip, means for feeding a sensitized film within said casing and operable to produce feeding movement of said sensitized film upon swinging movement of the casing between normal and printing positions, and other means for feeding the negative film and operable to advance said negative film upon each movement of the casing from printing to normal positions, the means for feeding the sensitized film including a feed shaft extending transversely of the casing, a feed roller on the shaft, a crank on said shaft, and a link connecting said crank and base; said other means including a negative film feed roller, a ratchet mechanism for actuating the same, and a link connecting the ratchet mechanism with the guide means.

FERDINAND HOMRICH.